April 14, 1970    J. A. CAGIGAL GUTIERREZ    3,505,764

SYSTEMS OF CONSTRUCTION OF TERRACES

Filed March 6, 1968      3 Sheets-Sheet 1

INVENTOR
JESUS ALBERTO CAGIGAL GUTIERREZ

BY *MacGuire and Torres*

ATTORNEYS

April 14, 1970   J. A. CAGIGAL GUTIERREZ   3,505,764
SYSTEMS OF CONSTRUCTION OF TERRACES
Filed March 6, 1968   3 Sheets-Sheet 2

INVENTOR
JESUS ALBERTO CAGIGAL GUTIERREZ

BY MacGlaw and Town

ATTORNEYS

April 14, 1970   J. A. CAGIGAL GUTIERREZ   3,505,764
SYSTEMS OF CONSTRUCTION OF TERRACES
Filed March 6, 1968   3 Sheets-Sheet 3
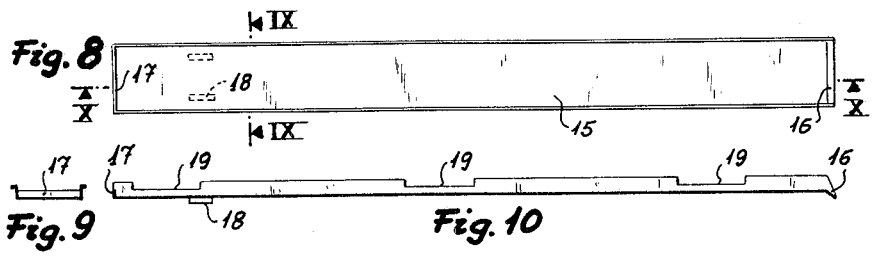
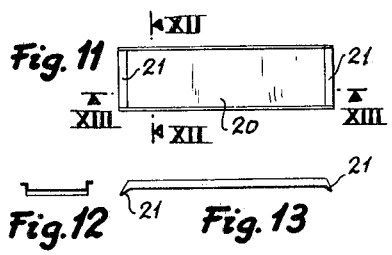 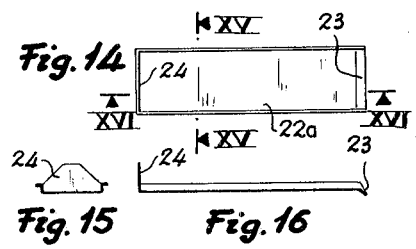
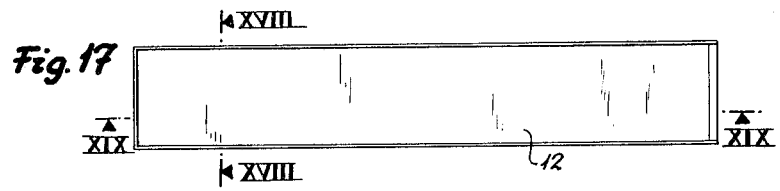
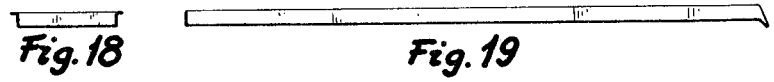
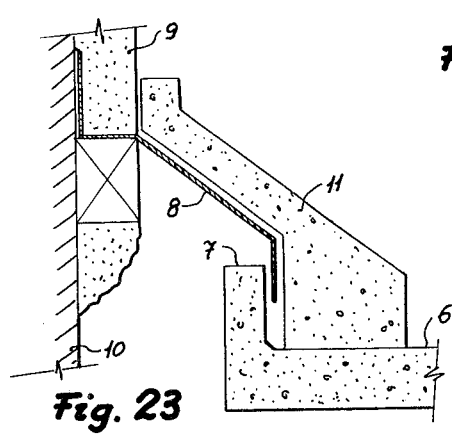 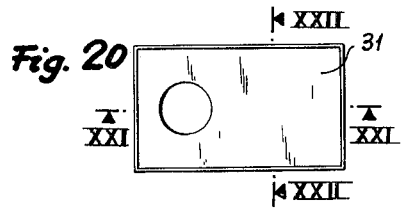
INVENTOR
JESUS ALBERTO CAGIGAL GUTIERREZ
BY  *McGlew and Toren*
ATTORNEYS United States Patent Office 3,505,764
Patented Apr. 14, 1970

3,505,764
SYSTEMS OF CONSTRUCTION OF TERRACES
Jesús Alberto Cagigal Gutierrez, Zurbano 35,
Madrid 4, Spain
Filed Mar. 6, 1968, Ser. No. 710,982
Claims priority, application Spain, Mar. 13, 1967,
337,970
Int. Cl. E04b 5/02; E04d 13/04
U.S. Cl. 52—11
4 Claims

ABSTRACT OF THE DISCLOSURE

A terrace construction is made up of a plurality of coplanar juxtaposed tiles supported by spaced sustaining elements and with channels beneath the joints between juxtaposed tiles for draining the terrace. The sustaining elements have three rigid coplanar support means and one elastically mounted support means and each sustaining element is located at the intersecting joints between four tiles. Each support means of a sustaining element contacts a different tile. Cementitious material is placed in the elastically mounted sustaining element to fix it in coplanar position with the other three rigid support means supporting a tile.

---

In the U.S. Patent No. 3,307,302, a description is given of the form of a support system of tiles for supporting sustaining elements. The sustaining elements have general H-shaped form in order to leave space between its upper branches for water drainage channels, the result being to reduce the supporting surface by means of the arrangement to four separate projecting pieces or columns, thus achieving greater stability of the tiles.

The present invention is directed to improvements which have been introduced in the support system for tiles in a terrace. Such improvements involve mainly the tiles, the pieces supporting the tiles, the water drainage channels, the manner in which the terrace terminates against peripheral apron walls, and the form of hanging and giving a slope to the water drainage channels.

The support pieces provide both the four separate points of support for the tiles and the housing for the channels, as disclosed in the above mentioned patent, but one of the supports is elastic, and, in addition, they present a continuous support surface on the floor beams and not feet as was formerly the case. The elastic support ensures an exact and automatic seating of each of the tiles on four separate points, and the lower continuous surface provides a better arrangement for the levelling and seating of the support pieces.

The tiles present a horizontal perimeter which is toothed (in place of straight sides) thus compelling the tiles to be correctly placed, without any possibility of displacement with respect to adjoining tiles, and, in addition, the joint affords the form of a grid or grille which traps any rubbish that may be on the terrace (leaves, fragments of paper or cloth, etc.). Further, the tiles have a vertical profile with double flashing, which in the previous tiles was single.

The drainage channels, for the sake of greater ease in construction, transport and assembly, are straight, without arms, and the grillage under the joints of the tiles is achieved by means of the super-imposition of various shapes.

There is retained, as a fundamental characteristic, the separation of the elements with a load-bearing function that is the tiles and columns, from the elements whose function is to carry off the water that is the channels. The channels do not support any weight since the weight on the terrace and that of the tiles themselves is transmitted to the floor beams exclusive through the columns or support elements, since the tiles are not in contact with the channels.

With the aim of enabling the invention to be better understood, in the annexed drawings, complementary to the present disclosure, there is represented a practical form of the present invention.

IN THE DRAWING

FIGURE 8 shows a plan view of an intermediate drainage channel;

FIGURE 9 shows a section of FIGURE 8 through the plane IX—IX;

FIGURE 10 shows a section of FIGURE 8 through the plane X—X;

FIGURE 11 shows a plan view of a small channel;

FIGURE 12 shows a section of FIGURE 11 through the plane XII—XII;

FIGURE 13 shows a section of FIGURE 11 through the plane XIII—XIII;

FIGURE 14 shows a plan view of a peripheral channel;

FIGURE 15 shows a section of FIGURE 14 through the plane XV—XV;

FIGURE 16 shows a section of FIGURE 14 through the plane XVI—XVI.

FIGURE 17 shows a plan view of a main drainage channel;

FIGURE 18 shows a section of FIGURE 17 through the plane XVIII—XVIII;

FIGURE 19 shows a section of FIGURE 17 through the plane XIX—XIX;

FIGURE 20 shows a plan view of a drainage catch basin head;

FIGURE 21 shows a section of FIGURE 20 through the plane XXI—XXI;

FIGURE 22 shows a section of FIGURE 20 through the plane XXII—XXII;

FIGURE 23 shows a section of FIGURE 1 through the plane XXIII—XXIII;

Figure 1:
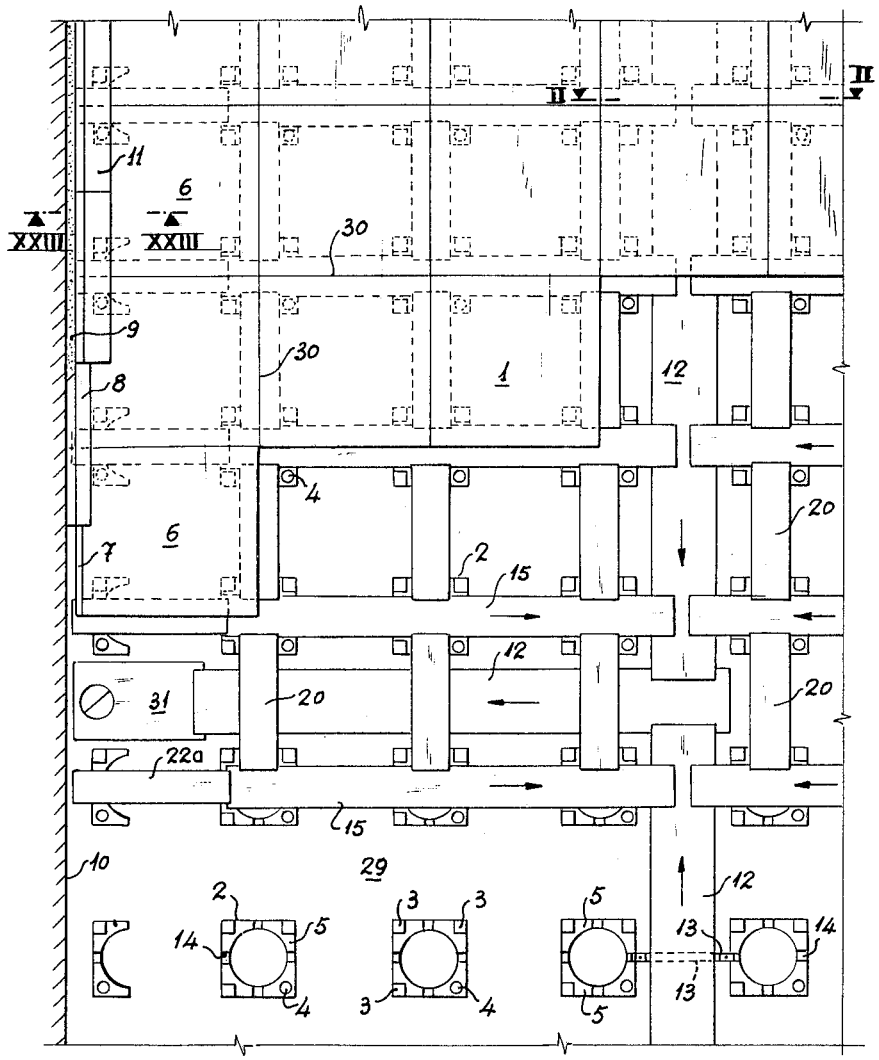
FIGURE 1 shows a plan view of a terrace constructed in accordance with the present invention in which drawing a part of the tiles and channels are omitted in order that the internal organization of support and drainage elements may be more clearly appreciated.
Figures 24, 25:
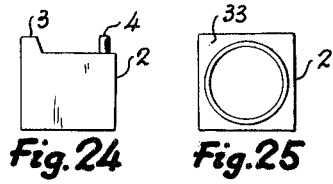
FIGURE 24 shows a side view of a column or support.
FIGURE 25 shows a plan view of the lower face of a column or support.
Figure 2:
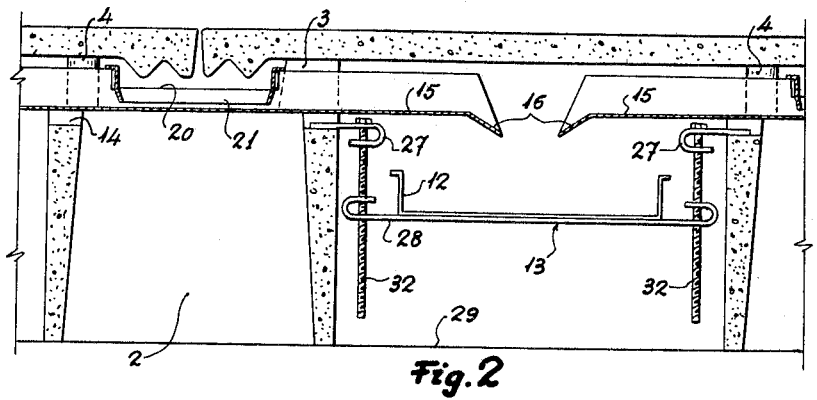
FIGURE 2 is a section of FIGURE 1 through the plane II—II in FIGURE 1.
Figure 3:
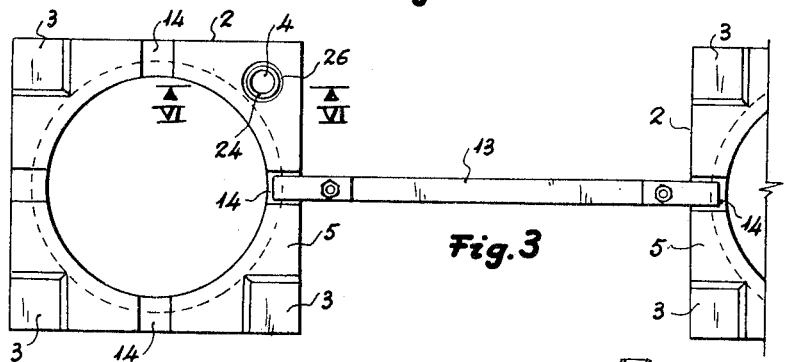
FIGURE 3 shows a plan view of the adjustable support of the channels, resting on two columns or support elements.

FIGURE 1 shows a terrace constructed of square tiles 1 in this case, though they could equally well be recangular. The tiles are independent from one another and are supported on columns or prefabricated support elements 2 each having four support points, three of the support points are rigid 3 and one of the support points 4 is elastic. These elements replace those formed by four columns and cross pieces, in accordance with the U.S. Patent 3,307,302, and are substantially equal to those elements, with the novelty of the invention residing in the elastic support points 4 and in a closed perimeter 33 on the lower part of the support elements.

Figure 4:
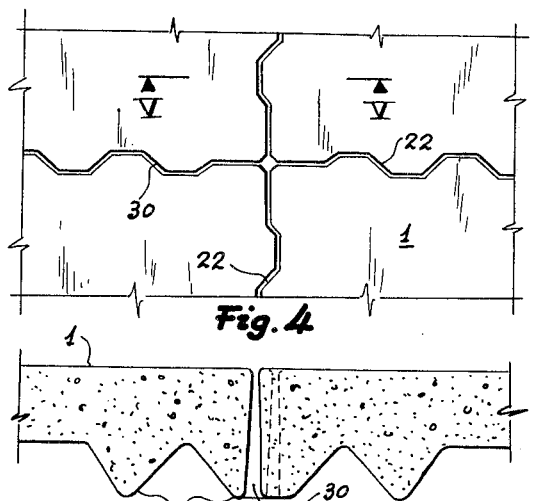
FIGURE 4 shows the junction of four tiles, and the toothed horizontal perimeter of the tiles and the manner of fitting one to the other.

The tiles, by comparison with the above mentioned patent, provide the novelty of a toothed perimeter 22 see FIGURE 4 (this is not illustrated in FIGURE 1 due to the difficulty of showing it in such a small drawing), in place of straight sides and a double spillway profile, see FIGURE 23. Each tile rests on four different columns 2: on three of the columns it bears on a rigid support 3, and on the fourth column it rests on an elastic support. These columns 2 are situated, as in U.S. Patent No. 3,307,302 on the intersections of the channels, which pass between the supports 3 and 4 and rest on the plane surface 5 of the columns.

Figure 5:
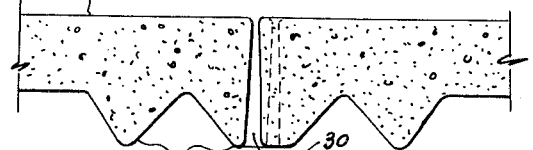
FIGURE 5 is a section of FIGURE 4 through the plane V—V.
Figure 6:
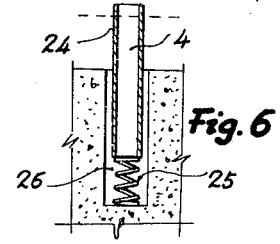
FIGURE 6 is a section of FIGURE 3 through the plane VI—VI.
Figure 7:
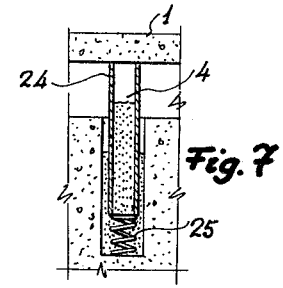
FIGURE 7 is shows the same section as in FIGURE 6, but after the tube has been filled with cement grout, and a tile placed upon the support.

The elastic support 4 is constituted by a tube 24 which rests on a spring 25, and both parts of the elastic support are housed in the orifice 26 of the clumn 2, see FIGURES 5 and 7. Before a tile 1 rests on the elastic support 4 the latter exceeds the height above plane 5 of the rigid supports 3.

Once a tile 1 has been set in place, it will rest on three rigid supports 3 the three points of contact define a plane, and will cause the support tube 4 to recede into the orifice 26 as the spring is compressed. Having previously poured cement grout or another agglomerate through the tube 4, as soon as it sets the elastic support is converted into a rigid support and remains in contact with the tile 1 since the spring 25 has been pressing the tube 24 against the tile 1 during the setting process.

As shown in FIGURE 23, the tiles 6 about the perimeter of the terrace are equipped with an inwardly projecting piece or sill 7; on the projecting piece a flexible sheet 8, such as lead sheet, aluminium, etc. is fitted, which sheet at its upper part contacts the facing 9 of the wall 10 and horizontally extending and a vertically extending part of the sheet is covered by the facing.

A rigid footing 11 is supported at its base on the tile and, at its upper end, against the facing 9 protecting the flexible sheet 8. The water which flows over the facing 9 is conducted by the sheet 8 over the tile 6, and, due to the projecting piece 7 of the tile, cannot filter below the tiles except along the joint between two tiles, from where it will be collected by an appropriate peripheral gutter 22a.

The water drainage system is formed as follows:

By the main channels 12 are supported on the adjustable supports 13; see FIGURES 2, 3 and 17 to 19 which in turn, hang from the columns 2, being hung from notches 14 in the planes 5 of the columns 2.

By the channels 15 which empty into the channels 12, see FIGURES 1 and 8 to 10, and terminate in downspouts 16 at one end and in a wall 17 at the other end; these channels 15 have protuberances 18 in the manner of small legs which provides the appropriate drainage gradient slope. The protuberances rest on the planes 5 of the columns 2.

By the channels 20, ending in downspouts 21 at both ends, see FIGURES 11 and 13, which rest on and empty into the channels 15. The channels 20 are supported in the notches in the sides of the channels 15, see FIGURE 10; and By the peripheral channels 22a, see FIGURES 14 and 16, which at one end have downspouts 23 supported on the end 17 of the gutters 15, and at the other end, have the other termination in a wall 24.

The water which flows along the joints 30 between the tiles drop into the channels 22a and 15 and through these reaches the main channels 12 through which it is lead to a downspout 31.

The adjustable supports 13 are formed by two threaded rods 32 which extend through flanges 27, 28 when the rods rotate, since the orifices of the curved flanges 27 are not threaded, but the orifices of the flange 28 are threaded, cause the flange 28 to vary its distance from floor beams 29. By suitably adjusting the flanges 28 on which the channel 12 rests, the channel is given the appropriate slope.

What I claim is:

1. A terrace construction comprising a complex of substantially coplanar juxtaposed tiles supported by a plurality of spaced sustaining elements disposed beneath said complex of tiles, each sustaining element including three support means rigidly mounted in the upper portion of said sustaining element and extending substantially vertically therefrom, said three support means terminating in three substantially coplanar support points disposed above the upper portion of said sustaining element and substantially coinciding with the plane of the under surface of said complex of tiles, each sustaining element further including a fourth support means elastically mounted in a vertically extending open-top closed bottom cavity provided in the upper portion of said sustaining element, said fourth support means comprising a compression spring disposed within said cavity at the bottom portion thereof and a tubular element of fixed length extending to within said cavity into biasing engagement with said spring and terminating outside said cavity and above the upper portion of said sustaining element in a fourth support point, the fully relaxed length of said spring and the fixed length of said tubular element being of an overall length sufficient to position said fourth support point above the plane of said three coplanar support points, and the fully compressed length of said spring and the fixed length of said tubular element being of a shorter overall length insufficient to position said fourth support point above said plane, and a body of set cementitious material within said cavity and fixing said spring and said tubular element in a position wherein said fourth support point is coplanar with said three support points.

2. A terrace construction, as set forth in claim 1, wherein the said tiles having a toothed-like configuration along their sides in a regular repeating pattern so that juxtaposed tiles will interengage one another in a regular design.

3. A terrace construction, as set forth in claim 1, wherein a plurality of drainage channels aligned below the joints between juxtaposed said tiles for forming a drainage network for the terrace, and adjustable means for supporting at least certain of said drainage channels, the said means comprising flange members supported on said sustaining elements, threaded rods rotatably supported in said flanges and extending downwardly therefrom, and a support bar in threaded engagement with said support rods so that by rotating said threaded rods said support bar moves upwardly and downwardly thereon, said support bars supporting certain of said drainage channels and so providing the desired slope for said drainage channels by appropriately positioning said bars on said threaded rods.

4. A terrace construction, as set forth in claim 1, wherein said tiles rotated at the periphery of the terrace having an upwardly projecting lip along the edge defining the periphery of the terrace, an upwardly extending flexible metallic plate extending downwardly passed the inwardly directed face of said projecting piece and said flexible plate extending upwardly and outwardly above said projecting piece, means for securing the upper end of said flexible plate and a member supported on said perimeter tiles and spaced closely from and in parallel relationship with said flexible plate for forming a passageway therebetween for conveying water betwen said flexible plate and said member for directing the water onto said perimeter tiles and then through the joints in the tiles into said drainage channels therebelow.

References Cited

UNITED STATES PATENTS

| | | | |
|---|---|---|---|
| 1,776,572 | 9/1930 | Tise | 52—440 |
| 2,368,330 | 1/1945 | Schwartz | 94—13 X |
| 2,688,291 | 9/1954 | Cannard | 52—14 X |
| 2,919,476 | 1/1960 | Fritz | 52—393 |
| 3,307,302 | 3/1967 | Gutierrez | 52—14 X |
| 3,383,816 | 5/1968 | Hodson | 52—263 |

FRANK L. ABBOTT, Primary Examiner

P. C. FAW, Jr., Assistant Examiner

U.S. Cl. X.R.

52—126, 263, 436; 61—14; 94—13